United States Patent [19]

Engelfriet et al.

[11] Patent Number: 5,406,042
[45] Date of Patent: Apr. 11, 1995

[54] DEVICE FOR AND METHOD OF PROVIDING MARKS ON AN OBJECT BY MEANS OF ELECTROMAGNETIC RADIATION

[75] Inventors: Adrianus R. C. Engelfriet; Gerrit C. Verkade; Sipke Wadman, all of Eindhoven, Netherlands

[73] Assignee: U.S. Philips Corporation, New York, N.Y.

[21] Appl. No.: 594,518

[22] Filed: Oct. 4, 1990

[30] Foreign Application Priority Data

Sep. 17, 1990 [NL] Netherlands ................. 9002036

[51] Int. Cl.⁶ .................................... B23K 26/06
[52] U.S. Cl. ........................ 219/121.68; 219/121.75
[58] Field of Search ............. 219/121.68, 121.69, 219/121.73, 121.74, 121.75; 346/76 L, 108; 359/641; 385/33, 39

[56] References Cited

U.S. PATENT DOCUMENTS

| | | | |
|---|---|---|---|
| 3,286,193 | 11/1966 | Koester et al. | 219/121.73 |
| 3,588,439 | 6/1971 | Heller et al. | 219/121.68 |
| 4,676,586 | 6/1987 | Jones et al. | 350/96 |
| 4,681,396 | 7/1987 | Jones | 385/33 |
| 4,741,615 | 5/1988 | Calzavar et al. | 356/73.1 |
| 4,758,848 | 7/1988 | Nakano | 346/108 |
| 4,762,514 | 8/1988 | Yoshida | 219/121.69 |
| 4,822,975 | 4/1989 | Torigoe | 219/121.85 |
| 4,844,574 | 7/1989 | Chande | 385/39 |
| 4,997,250 | 3/1991 | Ortiz, Jr. | 385/33 |
| 5,011,253 | 4/1991 | Olsen | 385/33 |
| 5,012,066 | 4/1991 | Matsutani et al. | 219/121.68 |

FOREIGN PATENT DOCUMENTS

| | | | |
|---|---|---|---|
| 0201306 | 5/1986 | European Pat. Off. | |
| 2654842 | 5/1991 | France | |
| 3509421 | 9/1985 | Germany | |
| 62-45487 | 2/1987 | Japan | |
| 62-110889 | 5/1987 | Japan | |
| 62-193643 | 8/1987 | Japan | |
| 64-2790 | 1/1989 | Japan | 219/121.75 |
| 1-44294 | 2/1989 | Japan | |
| 2-284786 | 11/1990 | Japan | |
| 57-94482 | 6/1992 | Japan | 219/121.75 |
| 8803076 | 7/1990 | Netherlands | 385/33 |
| 2154017 | 8/1985 | United Kingdom | |

*Primary Examiner*—Geoffrey S. Evans
*Attorney, Agent, or Firm*—Ernestine C. Bartlett

[57] ABSTRACT

In a marking system a pattern of marks present in a mask (30) is transferred to the surface (51) of an object (50) by causing radiation to act on the surface (51) via a mask (30). By adapting the shape and the area of the cross-section of the radiation beam to the pattern to be shown, the pattern is irradiated at a high intensity while the amount of radiation falling outside the pattern is reduced. This is achieved by adapting the cross-section of the beam by means of an exchangeable optical guide and/or cylindrical lenses (21, 22) and/or by stepwise scanning the mask (30) in one or two directions by means of a scanning system (23, 24) while the irradiated parts ($I_1, \ldots, I_n$) overlap each other to a considerable extent.

28 Claims, 2 Drawing Sheets

DEVICE FOR AND METHOD OF PROVIDING MARKS ON AN OBJECT BY MEANS OF ELECTROMAGNETIC RADIATION

FIELD OF THE INVENTION

The invention relates to a marking system for providing a pattern on a surface of an object by means of electromagnetic radiation, which marking system comprises a radiation source unit having a radiation exit plane and an optical system for irradiating a mask, in which the pattern to be provided is present, by means of a radiation beam from the radiation exit plane. A device of this type is used, for example, for providing marks such as a logo, a word for a name or a function, a pictogram or another image on the surface of an apparatus and/or an operating key. The mask pattern is permanently provided on the object by illuminating the surface via the mask once or a number of times by means of very intense radiation.

BACKGROUND OF THE INVENTION

A device of this type is known from U.S. Pat. No. 3,588,439. This patent describes how a laser beam is widened to the mask diameter via lens system and how the mask is imaged in a reduced form on the object by means of an objective system. A first major drawback of this system is that the mask is illuminated by means of a circular radiation beam having a constant diameter. In a mask comprising an elongate pattern, for example, a word, this has the drawback that a large part of the radiation incident on the mask is arrested by the mask and only a small part falls within the pattern and reaches the surface. This necessitates a long exposure time.

A second major drawback of the known device is that it is not suitable for providing marks on a large surface. If a large continuous pattern is desired, a number of juxtaposed subpatterns will have to be provided when using the known device. Visible interfaces between these subpatterns, where the surface is not irradiated or where it is irradiated twice, will be inevitable.

SUMMARY OF THE INVENTION

It is one of the objects of the invention to provide a marking system in which the above-mentioned drawbacks are obviated and to provide objects in which marks of a relatively large format are provided homogeneously on their surface. It is also an object of the invention to provide a method of providing marks on a surface in which an efficient use of radiation is possible and in which the radiation generated by the radiation source unit is predominantly led to the relevant part of the mask.

To this end the marking system according to the invention is characterized in that the optical system comprises a main imaging system for imaging the radiation exit plane on the mask, and in that the optical system is provided with means for adapting the dimensions of the cross-section and/or the position of the radiation beam to the shape and/or the location of the mask area where the pattern is present. By imaging the radiation exit plane on the mask by means of scanning or deforming imaging optical systems, it is possible to expose only that part of the mask where the pattern of marks to be provided on the surface is present. Parts of the mask where no marks are present are not irradiated so that a larger area can be exposed at a sufficient intensity.

A first embodiment of the marking system according to the invention is characterized in that the main imaging system comprises two cylindrical lenses whose cylindrical axes are substantially perpendicular to each other, the two cylindrical lenses having a different power for imaging the radiation exit plane on the mask in two directions and with different magnifications. As a result, for example, a round radiation exit plane is imaged as an ellipse on the mask. When the pattern to be imaged is a word, the magnification factors can be chosen to be such that a minimum possible amount of radiation falls outside the rectangle enclosing the word. Thus, considerably more radiation falls within this rectangle as compared with a situation in which the radiation exit plane would be imaged undeformed.

A second embodiment of the marking system according to the invention is characterized in that the optical system is further adapted to irradiate a part of the mask and in that means for consecutively irradiating overlapping parts of the mask are arranged in the radiation path between the radiation exit plane and the mask. This embodiment is based on the recognition that a large pattern can be irradiated at a sufficient intensity by irradiating parts of the pattern one after the other. When the chosen parts overlap each other to a considerable extent, so that each point of the pattern falls within a number of the irradiated parts, the transition at the edge of the parts will not be visible or will hardly be visible. The final result on the surface of the object is viewed as a uniformly provided mark without any visible interfaces.

For patterns having a large dimension in two directions the marking system may be further characterized in that the means for consecutively irradiating parts of the mask are adapted to irradiate parts which are offset with respect to each other in two directions. In this case the irradiation is carried out in accordance with a number of overlapping rows each consisting of a number of overlapping sub-irradiations. To obtain a homogeneous distribution, the nominal number of irradiations of each point on the surface should be a square.

This embodiment is further characterized in that the optical system comprises a field mask and an objective system which are arranged between the radiation exit plane and the mask, the field mask and the mask being arranged in conjugated planes of the objective system, and in that an adjustable deflection system for selecting a part of the mask on which the field mask is imaged is arranged between the field mask and the mask. In this system the radiation exit plane is not directly imaged on the mask but on a field mask serving as a diaphragm. This field mask is imaged on the actual mask. As a result the shape of the exposure spot on the mask can be better defined and this shape and the extent of overlap can be better adapted to each other when the mask is irradiated.

This embodiment is preferably further characterized in that the transmissivity has a gradient at at least one of the edges of the field mask. Due to a gradual transition of the transmissivity at the edge of the field mask, a small error in the positioning on the part of the mask to be irradiated results in a very small difference in total radiation intensity of the relevant points of the mask. A difference in contrast in the provided mark which is visible to the eye is then substantially excluded, even in the case of a small nominal number of irradiations. A linear variation of the transmissivity, hence a constant gradient, is sufficient.

This embodiment may be further characterized in that a field lens is arranged next to the field mask. Radiation passing through the field mask is deflected by the field lens towards the objective system. This reduces the diameter of the radiation beam at the location of the objective system so that lens errors in this system have less influence. The field lens preferably has a power with which the main imaging system and the objective system can be imaged on each other. The field lens may be arranged either in front of or behind the field mask, or, if the field lens comprises a plurality of elements, the field mask may also be arranged between these elements.

This embodiment of the marking system according to the invention is preferably further characterized in that the adjustable deflection system is a galvanometer mirror which is arranged between the objective system and the mask. A galvanometer mirror can be controlled accurately and rapidly, and by arranging this mirror between the objective lens and the mask the radiation always traverses the objective lens in the same way and in the same direction.

The marking system according to the invention may be further characterized in that the optical system between the radiation exit plane and the main imaging system comprises a further lens system whose focal length is at least one order of magnitude smaller than the focal length(s) of the main imaging system, the further lens system being present at a distance from the radiation exit plane, which distance is equal to the focal length of the further system. The further lens system functions as a condensor lens in this case so that the optical system forms an image of the radiation exit plane having a very large depth of focus. Due to a shadow effect the mask can be directly projected on the surface with a sufficient distance between the mask and the surface to be marked. A certain distance to the surface is necessary to prevent damage of the mask owing to gas and material originating from the surface.

A further drawback of the device known from U.S. Pat. No. 3,588,439 is that the radiation source unit is a laser. A laser generates a radiation beam within which a strong spatial variation in brightness prevails, with an approximately Gaussian form. The mask is thereby irradiated inhomogeneously, with the result that also the mark provided on the surface will exhibit a noticeable variation in brightness.

A preferred embodiment of the marking system according to the invention is therefore characterized in that an optical guide for homogenizing radiation generated by the laser is arranged in the radiation path between the laser and the optical system, and in that one end of the optical guide remote from the laser constitutes the radiation exit plane. By multiple reflection of the laser radiation in the optical guide the intensity distribution in the beam of laser radiation is lost and the end of the optical guide remote from the laser is uniformly illuminated without any spatial intensity variation.

It is to be noted that it is known per se from U.S. Pat. No. 4,741,615 to provide an illumination system for illuminating a mask with an optical guide for homogenizing the laser radiation. However, it is not known from this document that this aspect is used in a marking system and that the mask is selectively illuminated at those areas where the mask is transparent, for example, by adapting the shape of the radiation beam or by irradiating the transparent parts of the mask in a repetitive and overlapping manner.

A preferred embodiment of the marking system according to the invention is characterized in that the laser is suitable for generating radiation at a wavelength of at most approximately 1 μm, for example, an Nd:glass or an Nd:YAG laser. At this wavelength in the near infrared at which wavelength radiation is generated in, for example, a neodymium glass laser, glass is transparent and the elements of the optical system may be relatively inexpensive standard elements made from this material. This entails a considerable saving of costs as compared with optical elements which are transparent at longer wavelengths. The mask may then also consist of a metal pattern which is provided on a glass substrate, which is advantageous for patterns and letters like the letter "o" having a part which is detached from its surroundings.

This embodiment of the marking system according to the invention is further characterized in that the optical guide is a bent optical fiber. By giving an optical fiber sharp bends, a homogeneous light distribution at the end is achieved, even when the distribution at the input is inhomogeneous. Moreover, an optical fiber is flexible so that the laser and the optical system of the marking system can be arranged without any problem at some distance and in an arbitrary position with respect to each other.

It is to be noted that it is known per se from DE-A 35 09 421 to use an elongate transparent bent body for homogenizing the radiation beam of a laser. However, this known body also has constrictions and must thus be specially manufactured in accordance with a specification. Furthermore, it is a requirement for this body that the entrance and exit directions of the laser radiation are parallel to each other. Moreover, it is not known from this document that this homogenizing body is used in a marking system.

It is also to be noted that it is known from GB-A 2,154,017 to use an Nd:YAG laser for surfacing objects, using a flexible optical fiber for guiding radiation from the laser to the surface to be treated. It is not known from this document that the same fiber is used for homogenizing the laser radiation, nor is it known that a pattern of marks is applied on the surface via a mask.

The marking system according to the invention is preferably characterized in that the radiation guide or optical fiber is exchangeable so that the diameter of the radiation guide or optical fiber is adaptable to the extensiveness of the part of the pattern of marks to be irradiated and to the factor of magnification of the optical system. In this way the surface of the part of the mask to be irradiated can be changed by exchanging the radiation guide only. This has the advantage that the lenses need not be realigned and focused.

A preferred embodiment of the marking system according to the invention is further characterized in that the further objective lens is adapted to image the mask one to one, or magnified on the surface. Since the radiation distribution is homogeneous and since the radiation has a comparatively small wavelength, it is possible to use very well-defined masks with which very fine lines can be formed on the surface. This no longer makes it necessary to image the mask in a reduced form on the surface so as to create a pattern of marks having the desired definition. Since in the device according to the invention the electro-magnetic radiation is concentrated on the transparent parts of the mask, it is even possible to implement the mask to be smaller than the ultimate image and yet achieve a sufficient radiation intensity on the surface.

The marking system according to the invention is further characterized in that a further field lens is arranged next to the position of the mask. This further field lens has for its purpose to concentrate radiation issuing from the mask on the further objective lens so that lens errors in this further objective lens do not have any great influence on the image quality of the mask. Moreover, since only a small part of the further objective lens is used, the depth of focus of the image on the surface is large. The further field lens may also be arranged in front of, behind, or, if it is composed of various elements, on either side of the mask. The field lens has such a power that the objective system and the further objective lens are imaged on each other. If the field mask and the objective system are absent, the further field lens images the main imaging system and the further objective lens on each other.

The marking system according to the invention is preferably characterized in that an anti-reflection coating is provided on at least one of the optical elements in the marking system. An anti-reflection coating on the optical elements reduces the radiation loss due to Fresnel reflection so that a higher radiation intensity is obtained on the surface of the object and hence a pattern can be applied more quickly or a larger surface can be irradiated at a sufficient radiation intensity.

In another embodiment of the marking system according to the invention the marking system comprises a laser for generating radiation at a wavelength of approximately 1 $\mu$m, an optical fiber for homogenizing the radiation generated by the laser, and an optical system for imaging one end of the optical fiber remote from the laser on a mask in which the pattern to be provided is present, the optical system comprising a main imaging system and a further lens system whose focal length is at least one order of magnitude smaller than the focal length of the main imaging system, the further lens system being present at a distance from the radiation exit plane, which distance is equal to the focal length of the further system. In this embodiment a homogeneously irradiated mask is obtained which can be imaged on the object at a sufficient intensity to obtain an image having a homogeneous contrast and a linear dimension of more than 10 mm.

The embodiments in which further a lens system with a short focal length is arranged close to the radiation exit plane are further characterized in that the further system is provided with an anti-reflection coating. This anti-reflection coating prevents the radiation due to Fresnel reflection from being concentrated on or near the radiation exit plane and material in this plane from being damaged.

The invention also relates to a method of providing marks on a surface. According to the invention the method comprises the following steps:
generating electro-magnetic radiation by means of a laser;
homogenizing the generated radiation by causing it to traverse an optical guide;
irradiating a mask in which the marks to be provided are present by imaging one end of the optical guide remote from the laser on the mask, the dimensions of the irradiated part of the mask being adapted to the shape of the area of the mask occupied by the marks; and
projecting radiation passing through the mask on the surface to be marked.

A pattern having a homogeneous brightness and a linear dimension of at least approximately 10 mm can be provided on the object in this way.

A special embodiment of this method is further characterized in that largely overlapping mask parts are irradiated one after the other. The overlapping parts may be offset with respect to each other in two directions.

The advantages of these methods have been described in the foregoing with reference to the marking system and its special embodiments.

These and other, more detailed aspects of the invention will now be described in greater detail with reference to the drawings.

DESCRIPTION OF THE PREFERRED EMBODIMENTS

Figure 1A:
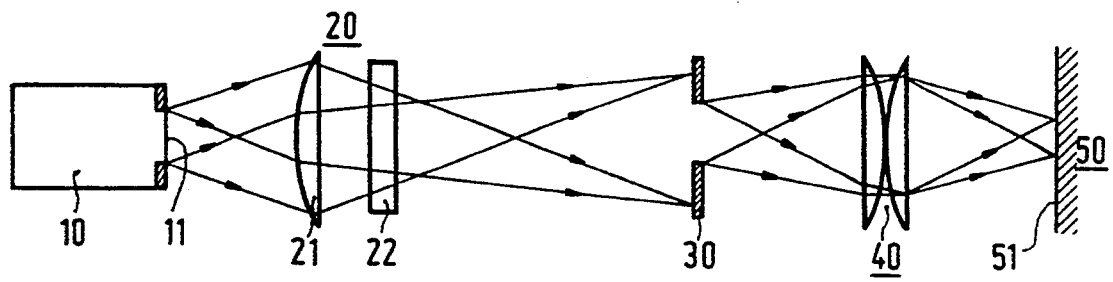
FIGS. 1a and 1b show embodiments in which only a part of the mask is irradiated by means of cylindrical lenses.
Figure 1B:
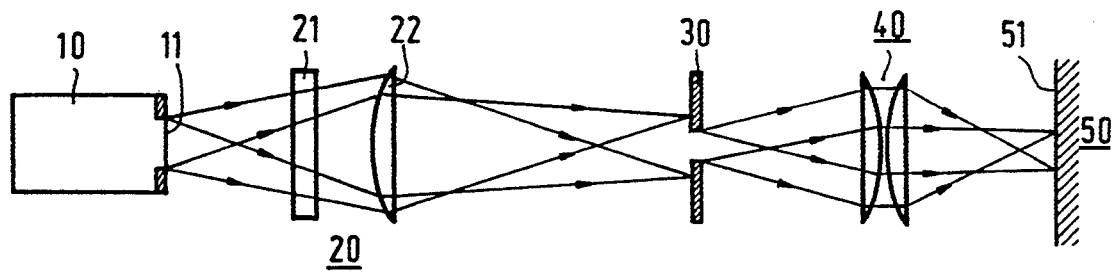

FIGS. 1a and 1b show diagrammatically a marking system according to one embodiment of the invention. These Figures show a radiation source unit 10 with a radiation exit plane 11. A mask 30 provided with a pattern of marks lying in a region of a given shape and dimensions is irradiated by radiation from the radiation source unit and subsequently imaged on the surface 51 of the object 50 by means of an objective system 40. The pattern which is provided oh the mask 30 is permanently transferred to the surface 51 in the case of a sufficiently intense irradiation. This is realized because the material of the surface 51 is heated, due to the effect of the radiation, and is discolored, is removed or decomposed by a chemical reaction or reacts with an ambient gas. The object 50 may be made from a material which is suitable for such an operation, or the surface 51 may be provided with a thin layer of such a material.

Apart from producing a direct effect of radiation on the material of the surface, it is alternatively possible to provide the surface with a material which, after irradiation, is still to be subjected to a chemical treatment in order to visualize the pattern and/or to fix it, for example, a photolacquer which must be developed after irradiation. A further operation may be etching away the material of the surface with the aid of chemical means on parts which are irradiated or not irradiated.

Although the mask 30 is shown as a mask which is transparent at the locations of the marks to be indicated, a mask may of course also be reflective at these locations, which reflecting parts of the mask are imaged on the object. The rest of the mask is then absorbing or, to prevent heating of the mask, transparent.

To obtain a uniform, bright mark pattern which is rich in contrast, the positions of the marks should be evenly irradiated at a sufficient intensity. When the marks constitute an elongate shaped pattern, this means that much radiation reaches opaque parts of the mask and is lost when the radiation exit plane 11 is imaged undeformed on the mask. This in turn means that the irradiation takes a long time and requires much a significant amount of energy.

The optical system in the marking system according to the invention, as shown in FIGS. 1a and 1b, comprises two cylindrical lenses 21 and 22 whose cylindrical axes, i.e. the directions in which the lenses have no optical power, are perpendicular to each other. In FIG. 1a, for example, the cylindrical axis of lens 21 is normal to the drawing sheet and the cylindrical axis of lens 21 lies in the plane of the drawing sheet running from the top to the bottom of the sheet. FIG. 1a is an alerational view of a marking system in the plane in which the lens 21 has power and FIG. 1b is an elevational view of the plane in which the lens 22 has power. The two cylindrical lenses have a different optical power so that the radiation exit plane 11 in the two directions is imaged on the mask 30 with a different magnification. If the exit plane shape is round, its image on the mask is elliptically shaped. The intensity distribution within the plane does not change due to the cylindrical lenses so that a homogeneous intensity distribution in the exit plane 11 leads to a similarly homogeneous intensity distribution within the image on the mask 30. Since the shape of the image from the exit plane is now deformed, for example, elliptically shaped, more radiation falls within the part of the mask where an elongate pattern, for example, a word to be displayed is present. That is, the shape of the radiation image is changed to more closely match the geometry of the pattern and at the same time, the intensity distribution is substantially uniform. The major axis of the ellipse should of course be directed in the longitudinal direction of the pattern. Due to the deformation of the image shape, more radiation passes through the mark than without the deformation and thus the intensity of the radiation passing through the mask is higher and a shorter irradiation time may thus be sufficient. If a relatively small deformation may be sufficient to more closely match the pattern shape, the two cylindrical lenses 21 and 22 may be formed from one piece of transparent material whose two planes are cylindrically formed with mutually perpendicular cylindrical axes.

Figure 2:
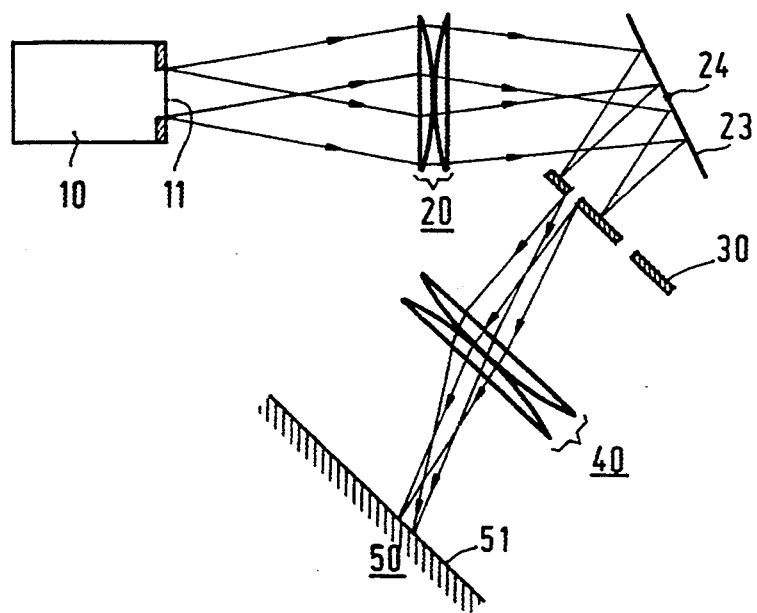
FIG. 2 shows an embodiment in which the mask is irradiated in parts and in steps.

FIG. 2 shows diagrammatically a second embodiment of the marking system according to the invention. The marking system comprises a radiation source unit 10 with an exit plane 11 and a mask 30. The radiation at the exit plane is imaged on the mask 30 by a main imaging system 20. Subsequently the mask is imaged on the surface 51 of the object 50 to be marked via a futher objective system 40. An adjustable deflection system, for example, a mirror 23 which is rotatable around an axis 24 is arranged in the radiation path between the main imaging system 20 and the mask 30. Other deflection systems may alternatively be used, such as a mirror polygon, a rotatable plane-parallel plate or a rotatable hologram.

In this embodiment the exit plane 11 is not imaged on the entire mask but only on a part of the mask and on a part of the pattern of marks. Subsequently the mask is scanned step by step by means of the deflection system 23, with each point of the mask to be irradiated being irradiated a number of times. When each point has been irradiated a sufficiently large number of times, for example, ten times, the difference between parts of the pattern irradiated once more or once less is no longer directly visible on the surface of the object. Hence, when the surface 51 to be irradiated and the mask 30 are relatively large, the entire surface and the entire mask can be irradiated without transitions being visible between parts which have been irradiated earlier and later. The stepwise irradiation may be realized, for example, by using a pulsed radiation source and by readjusting the deflection system stepwise in synchronism therewith. This deflection system may alternatively be operated slowly and continuously.

Figure 3:
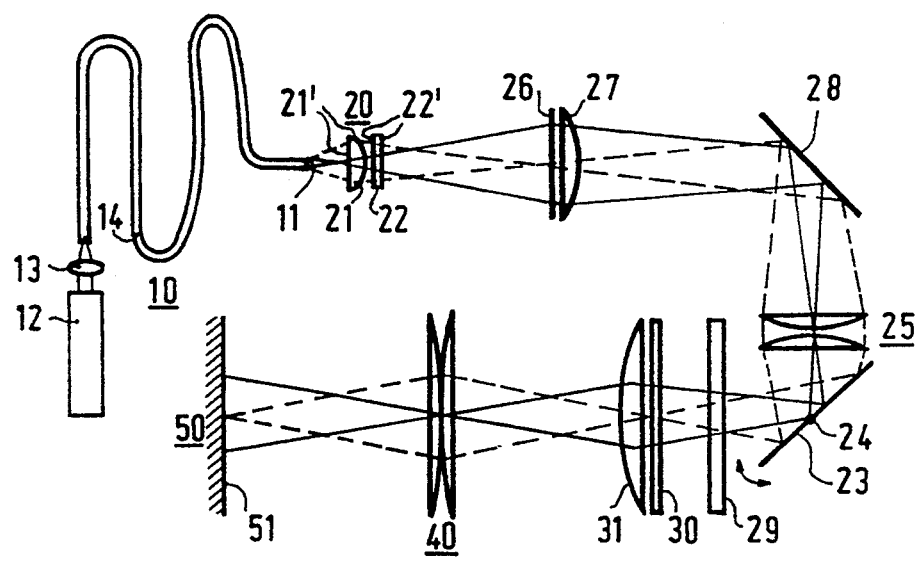
FIG. 3 shows a further embodiment in which a field mask is used and in which the radiation source unit comprises a laser and an optical guide.

FIG. 3 shows a further elaboration of this embodiment. This embodiment shows the radiation source unit 10 as a laser 12, for example, an Nd:YAG or an Nd:glass laser whose radiation is coupled into an optical fiber 14 by means of a lens 13. The fiber 14 is fairly long and has a number of bends so that the spatial variation of the radiation intensity in the generated laser beam is substantially eliminated at the end 11 of the fiber. The end is therefore homogeneously illuminated and does not exhibit the varied spatial energy distribution which is characteristic of such a laser. The fiber has a length of, for example 2 to 10 m and a core diameter of more than 100 μm. The end 11 of the fiber is the radiation exit plane of the radiation source unit 10. The exact diameter of the fiber is determined by the desired beam diameter at the area of the mask. By replacing only the fiber with a fiber having a different core diameter, the beam diameter can be adapted to the optimum diameter for another mask. Then it is not necessary to readjust the optical system.

The radiation at the exit plane 11 is imaged on a field mask 26 in a strongly magnified form by means of the main imaging system 20. The field mask 26 is a diaphragm having a square or rectangular aperture. If the aperture is rectangular, the main imaging system 20 will be preferably a cylindrical system, as described hereinbefore, with which the entire aperture is illuminated with a minimal loss of radiation. If the aperture is square, the two cylindrical lenses 21 and 22 may be replaced by a rotationally symmetrical system having the same power in the two directions.

The field mask 26 is imaged on a part of the mask 30 by the objective system 25. This mask comprises the pattern of marks to be transferred to the surface. A galvanometer mirror with which the position of the image of the field mask on the mask 30 can be displaced stepwise is arranged between the objective system 25 and the mask 30. An optical system 29 with which the curvature of the field of the objective system 25, and the curvature caused by the mirror 23 is eliminated (fieldflattener) may be arranged between the galvanometer mirror 23 and the mask 30. The pattern on the mask 30 is imaged by means of the objective system 40 on the surface 51 of the object 50 to be marked.

A field lens 27 is arranged next to the field mask 26. This lens is employed to concentrate the radiation incident through the field mask 26 on the objective system 25. Since the radiation is only incident on a small part of the objective system 25, the field mask 26 is imaged on the mask 30 with a large depth of focus and lens errors have little influence on the quality of the image.

A field lens 31 is also arranged next to the mask 30. This further field lens concentrates the radiation on the further objective lens 40 and also has favorable effects on the quality of the image of the mask 30 on the surface 51.

Figure 4:
FIG. 4 shows in which way parts of the mask overlapping each other are irradiated.

The way in which the field mask 26 is stepwise imaged in an overlapping way on the mask 30 is illustrated in FIG. 4. The mask 30 is irradiated by pulses, with the field mask forming an image $I_i$, $i=1, \ldots, n$, on a part of the mask on which a pattern of marks to be imaged is provided, which is denoted by TEXT in the Figure. The images $I_i$ formed by the pulsed or stepwise irradiation overlap each other to a considerable extent so that each point of the pattern TEXT falls within a number of images, which number is so large that one irradiation more or less does not have a visible effect on the pattern of marks produced on the surface 51. The exact nominal number depends on the intensity of the radiation and on the properties of the material of the surface 51. The field mask may be provided with edges which gradually decrease in transparency. As a result, a positioning which is not entirely correct hardly affects the amount of radiation at the edge of the irradiated part and hence on the brightness of the mark which has been provided.

To irradiate each point of the pattern TEXT to a sufficient extent, it is necessary to perform a number of lead-in and lead-out irradiations which largely cover areas of the mask where there are no marks. In the Figure these are the areas $I_1, \ldots, I_3$ and $I_{n-2}, \ldots, I_n$.

It is to be noted that for clarification of the Figure the edges of the irradiation fields $I_i$ shown do not coincide with the direction of displacement of the fields across the mask. In practice they will preferably coincide. Moreover, the path along which two consecutive images are offset will preferably be equal to 1/N of the width of the image, in which N is the nominal number of illumination pulses to which each point of the pattern is exposed.

To irradiate a pattern of marks having a relatively large dimension in two directions in a uniform manner, the parts to be irradiated may be offset with respect to each other in two directions. Irradiation is then effected in a number of rows of overlapping parts, which rows overlap each other as well. The best result is obtained when the extent of overlap in the two directions is equal, i.e. when the nominal number of irradiations for each point is a square. The first irradiations of two further rows are indicated by $J_1$ and $K_1$ in FIG. 4. The irradiation of parts of the mask can be realized by adjusting the deflection system in steps and by generating, in synchronism therewith, a radiation pulse in the radiation source. The adjustment may alternatively be controlled continuously, with a radiation pulse of short duration being generated at regular instants when the adjustment has the correct value.

Figure 5:
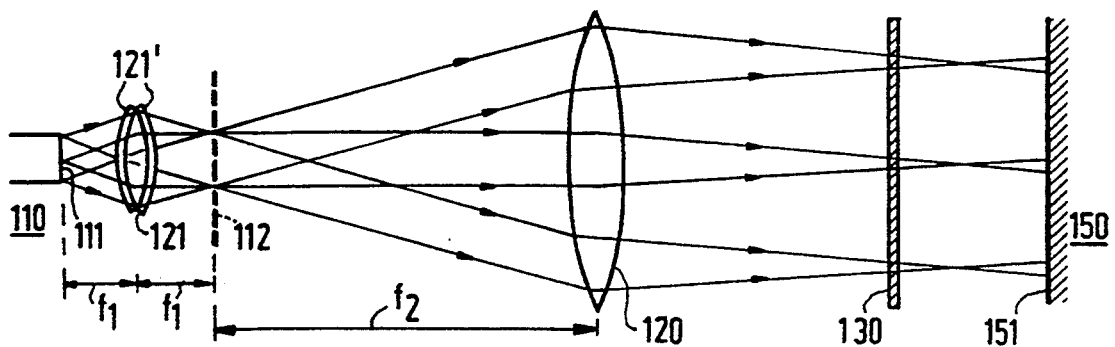
FIG. 5 shows an optical system for a marking device with an imaging system having greatly different focal lengths and with the mask being imaged one to one on the surface.

FIG. 5 shows a slightly different optical system for the marking system according to the invention. In this Figure only the radiation exit plane 111 of the radiation source unit 110 is shown, for example, the end of a fiber. The radiation exiting from the plane 111 is captured by means of a first lens 121. The positive lens 121 has a focal length $f_1$ and is also arranged at that length from the radiation exit plane 111. Radiation emitted in different directions and originating from the same point on the radiation exit plane is collimated to a parallel beam by the lens. Beams originating from the different points on the plane intersect each other in a plane 112 which is located at a length $f_1$ at the other side of the lens 121. A second lens 120 having a focal length $f_2$ concentrates the radiation from the plane 112 to a substantially parallel beam in which the mask 130 with the pattern of marks is placed. To this end the distance between the plane 112 and the lens 120 is equal to the focal length $f_2$ of the second lens 120. The focal length of the second lens 120 is at least one order of magnitude larger than that of the first lens 121. Consequently, an image of the radiation at exit plane 111 having a very large depth of focus is produced behind the lens 120. It is therefore possible to irradiate both the mask 130 and the surface 151 and to image the pattern in the mask without the interposition of an objective lens. Due to the relatively large depth of focus a sufficient distance between the surface 151 and the mask 130 can be observed so as to prevent the mask from being damaged by gas or material being released during marking of the surface.

In one embodiment of the marking system the radiation source unit is an Nd:YAG laser which generates radiation at a wavelength of approximately 1 $\mu$m. The radiation is passed through a fiber having a diameter of 1000 $\mu$m. The lens 121 is a biconvex lens having a focal length of 7 mm and is arranged at approximately 8 mm from the end face of the fiber. The second lens 120 is a plano-convex lens having a focal length of 300 mm and is arranged at approximately 320 mm from the end face of the fiber. The mask is arranged at 480 mm from the fiber and is homogeneously illuminated with a beam having a diameter of approximately 43 mm. The lenses are not exactly arranged at 7 and 314 mm because the lenses themselves have a thickness.

Alternatively to a rotationally symmetrical lens, the lens 120 may be in the form of two cylindrical lenses having mutually crossed cylindrical axes. As already stated in the foregoing, this results in a different height-width ratio of the irradiated field on the mask. The lens 121 may also be composed of two cylindrical lenses.

By making use of the device and method described hereinbefore, an extensive and homogeneous pattern can be provided on an object such as, for example, the front side of a portable radio or a car-mounted radio. Particularly, such an apparatus may have a front side or operating keys which are illuminated from the interior. To this end the relevant part is made from a transparent material, which is white or colored, and its front side is provided with a dark, opaque layer of, for example, a black synthetic material. The dark synthetic material is removed homogeneously and completely by means of the marking system according to the invention without the underlying transparent material being affected by the radiation. By arranging a light source in the apparatus behind the pattern provided in this way, the inscription on the mark at the outer side of the apparatus is easily visible, even under poor conditions of light.

What is claimed is:

1. A marking system for providing a pattern on a surface of an object by electromagnetic radiation, which marking system comprises a radiation source having a radiation exit plane for generating a radiation beam of a first transverse shape and dimensions and an optical system for irradiating a first mask containing said pattern with said beam, said pattern contained on said mask having a second shape and dimensions, said pattern being provided on said surface by said radiation beam incident on said mask, said optical system comprising a main imaging system for imaging a substantially evenly illuminated radiation exit plane on the mask, and means for adapting the transverse shape and dimensions of the radiation beam to the shape and dimensions of the pattern contained on said mask.

2. A marking system as claimed in claim 1 wherein the main imaging system comprises two cylindrical lenses whose cylindrical axes are substantially perpendicular to each other, and wherein said two cylindrical lenses differ from each other in their power for imaging the radiation exit plane on the mask in two directions and with different magnifications.

3. A marking system as claimed in claim 1 wherein the optical system is further adapted to irradiate a part of the mask and includes means for consecutively irradiating overlapping parts of the mask arranged in the radiation path between the radiation exit plane and the mask.

4. A marking system as claimed in claim 3 wherein the means for consecutively irradiating parts of the mask are adapted to irradiate parts which are offset with respect to each other in two directions.

5. A marking system as claimed in claim 1 including means for adapting the position of the radiation beam to the location of the pattern contained on said mask.

6. A marking system as claimed in claim 1 wherein the optical system comprises a field mask and wherein the field mask has a radiation transmissivity, the radiation transmissivity having a gradient at least at one of the edges of the field mask.

7. A marking system as claimed in claim 6 including a field lens next to the field mask.

8. A marking system as claimed in claim 1 wherein the optical system comprises an adjustable deflection system and wherein the adjustable deflection system comprises a galvanometer mirror which is arranged between the objective system and the first mask.

9. A marking system as claimed in claim 1 wherein between the radiation exit plane and the main imaging system a further lens system is included whose focal length is at least one order of magnitude smaller than the focal length of the main imaging system, the further lens system being present at a distance from the radiation exit plane, which distance is equal to the focal length of the further system.

10. A marking system as claimed in claim 1 wherein the radiation source comprises a laser, said marking system including an optical guide having at least one end remote from the laser for homogenizing radiation generated by the laser, said guide being in the radiation path between the laser and the main imaging system, said at least one end of the optical guide forming said radiation exit plane.

11. A marking system as claimed in claim 10 wherein the laser generates radiation at a wavelength of at most about 1 $\mu$m.

12. A marking system as claimed in claim 10 wherein the optical guide is a bent optical fiber.

13. A marking system as claimed in claim 12 wherein the optical system has a magnification factor and the optical fiber has a diameter and is exchangeable in said optical system so that the diameter of the optical fiber is adaptable to the geometry of the part of the pattern of marks to be irradiated and to the factor of magnification of the optical system.

14. A marking system as claimed in claim 1 including an objective lens in the radiation path between the first mask and the surface, said objective lens being adapted to image the first mask one to one on the surface.

15. A marking system as claimed in claim 14, including a field lens next to the first mask.

16. A marking system as claimed in claim 1 wherein the imaging system includes optical elements, said system including an anti-reflection coating on at least one of the optical elements.

17. The marking system of claim 1 wherein the radiation beam is further adapted to provide a substantially homogeneous intensity distribution in a two dimensional region at said mask.

18. A marking system for providing a pattern on a surface of an object by electromagnetic radiation, which marking system comprises a radiation source having a radiation exit plane for generating a radiation beam of a first transverse shape and dimensions and position and an optical system for irradiating a first mask containing said pattern with said beam, said pattern contained on said mask having a second shape and dimensions, said pattern being provided on said surface by said radiation beam incident on said mask, said optical system comprising a main imaging system for imaging the radiation exit plane on the mask, and means for adapting the transverse shape and dimensions of the radiation beam to the shape and dimensions of the pattern contained on said mask,
wherein the optical system is further adapted to irradiate a part of the mask and includes means for consecutively irradiating overlapping parts of the mask arranged in the radiation path between the radiation exit plane and the mask, the optical system also comprising a field mask and an objective system which are arranged between the radiation exit plane and the first mask, the field mask and the first mask being arranged in conjugated planes of the objective system; and including an adjustable deflection system, for selecting a part of the first mask on which the field mask is imaged, arranged between the field mask and the first mask.

19. A method of providing marks on a surface of an object, which method comprises the following steps:
generating electromagnetic radiation by a laser;
homogenizing the generated radiation by causing it to traverse an optical guide;
by means of an optical system irradiating a mask containing a pattern by imaging one end of the optical guide remote from the laser on the mask, substantially conforming the dimensions of the irradiated part of the mask to the shape of the area of the mask occupied by the pattern, and
projecting radiation passing through the mask on the surface to be marked.

20. A method as claimed in claim 19, in which largely overlapping parts of the mask are irradiated one after the other.

21. A method as claimed in claim 20 wherein the largely overlapping parts are offset with respect to each other in two directions.

22. A marking system for providing a pattern of marks on a surface of an object by electromagnetic radiation, which marking system comprises a laser for generating radiation at a wavelength of approximately 1 $\mu$m, an optical fiber for homogenizing the radiation generated by the laser, and an optical system for imaging one end of the optical fiber remote from the laser on a mask in which the pattern to be provided is present, said optical system comprising a main imaging system and a further lens system whose focal length is at least one order of magnitude larger than the focal length of the main imaging system, the further lens system being present at a distance from the radiation exit plane, which distance is substantially equal to the focal length of the further lens system.

23. A marking system as claimed in claim 2 wherein the further lens system includes an anti-reflection coating.

24. A marking system for providing a pattern on a surface of an object by electromagnetic radiation, which marking system comprises a radiation source having a radiation exit plane for generating a radiation beam of a first shape and dimensions and an optical system for irradiating a mask containing said pattern with said beam, said pattern contained on said mask having a second shape and dimensions, said pattern being provided on said surface by said radiation beam incident on said mask, said optical system comprising:
 a main imaging system for imaging the radiation beam at the exit plane on the pattern contained on said mask; and
 means for adapting the shape and dimensions of the radiation beam to the shape and dimensions of the pattern contained on said mask such that the intensity distribution incident on said mask is substantially uniform in a two dimensional region of said mask.

25. A marking system for providing a pattern on a surface of an object by electromagnetic radiation, said system including a radiation source having a radiation exit plane with an aperture of a first shape and dimensions for generating a radiation beam of a given intensity and a cross section of said first shape and dimensions, said system including an optical system for causing said beam to radiate a mask containing said pattern to be provided on said surface, said pattern contained on said mask having a second shape and dimensions, said optical system comprising:
 a main imaging system for imaging the radiation exit plane on the pattern of said mask; and
 means for adapting the first shape and dimensions of said radiation beam to the second shape and dimensions of said pattern contained on said mask to provide a substantially uniform intensity distribution of said given intensity on said pattern in at least a given two dimensional portion of said pattern on said mask.

26. A marking system for providing a pattern on a surface of an object by electromagnetic radiation, said system including a radiation source having a radiation exit plane with an aperture of a first shape and dimensions for generating a radiation beam of a given intensity distribution and a cross section of said first shape and dimensions, said system including an optical system for causing said beam to radiate a mask containing said pattern to be provided on said surface, said pattern contained on said mask having a second shape and dimensions, said optical system comprising:
 a main imaging system for imaging the radiation exit plane on the pattern of said mask; and
 means for providing a substantially uniform intensity distribution of said given intensity on said pattern in at least a given two dimensional portion of said pattern on said mask.

27. A marking system for providing a pattern on a surface of an object by electromagnetic radiation, which marking system comprises a radiation source having a radiation exit plane for generating a radiation beam of a first transverse shape and dimensions and position and an optical system for irradiating a first mask containing said pattern with said beam, said pattern being provided on said surface by said radiation beam incident on said mask, said optical system comprising a main imaging system for imaging a substantially evenly illuminated radiation exit plane on the mask, and means for adapting the position of the radiation beam to the location of the pattern contained on said mask.

28. A method of providing marks on a surface of an object, which method comprises the following steps:
 generating electromagnetic radiation by a laser having a radiation beam of a first transverse shape and dimensions and position;
 homogenizing the generated radiation by causing it to traverse an optical guide;
 by means of an optical system irradiating a mask containing a pattern with said beam by imaging one end of the optical guide remote from the laser on the mask, substantially conforming the position of the radiated beam to the location of the pattern on the mask, and projecting radiation passing through the mask on the surface to be marked.

* * * * *